United States Patent
Bergano et al.

[11] Patent Number: 5,946,119
[45] Date of Patent: Aug. 31, 1999

[54] WAVELENGTH DIVISION MULTIPLEXED SYSTEM EMPLOYING OPTIMAL CHANNEL MODULATION

[75] Inventors: Neal S. Bergano, Lincroft; Carl R. Davidson, Manalapan; Stephen G. Evangelides, Jr., Middletown, all of N.J.

[73] Assignee: Tyco Submarine Systems Ltd.

[21] Appl. No.: 08/799,728

[22] Filed: Feb. 12, 1997

[51] Int. Cl.⁶ ............................. H04J 14/02; H04B 10/04
[52] U.S. Cl. ........................ 359/124; 359/133; 359/181
[58] Field of Search ................................. 359/181–186, 359/124, 125, 132, 133, 134

[56] References Cited

U.S. PATENT DOCUMENTS

| | | | |
|---|---|---|---|
| 5,473,458 | 12/1995 | Mamyshev et al. | 359/181 |
| 5,515,196 | 5/1996 | Kitajima et al. | 359/183 |
| 5,745,613 | 4/1998 | Fukuchi et al. | 359/181 |
| 5,784,184 | 7/1998 | Alexander et al. | 359/125 |

FOREIGN PATENT DOCUMENTS 0064418  3/1988  Japan ..................... 359/158

*Primary Examiner*—Leslie Pascal
*Attorney, Agent, or Firm*—Mayer & Williams, LLC

[57] ABSTRACT

An apparatus is provided for transmitting an optical signal. The apparatus includes an optical signal source for generating an optical signal having a plurality of optical channels onto which data is modulated at a plurality of predetermined frequencies to provide a plurality of optical data channels. An amplitude modulator is coupled to the optical signal source for modulating each of the optical channels with a waveform that is independently adjustable from one another. A clock, coupled to the amplitude modulator, has a plurality of frequencies that respectively determine the modulation frequencies imparted to the plurality of optical channels by the amplitude modulator. Each of the frequencies of the clock is phase locked and equal to its respective predetermined frequency at which is data is modulated.

25 Claims, 9 Drawing Sheets

WAVELENGTH DIVISION MULTIPLEXED SYSTEM EMPLOYING OPTIMAL CHANNEL MODULATION

FIELD OF THE INVENTION

The invention relates to the optical transmission of information and more particularly, to improving the transmission capabilities of optical fiber transmission systems employing wavelength division multiplexed channels.

BACKGROUND OF THE INVENTION

Signals on optical fiber transmission lines characterized by large bit rate distance products, such as undersea or transcontinental terrestrial lightwave transmission systems and which employ optical amplifiers are subject to a host of impairments that accumulate along its length. The source of these impairments within a single data channel include amplified spontaneous emission (ASE) noise generated in the Erbium-Doped Fiber-Amplifiers (EDFAs), polarization dependent gain caused by hole burning in the EDFAs, polarization dependent loss (PDL) in the passive components, nonlinear effects resulting from the dependence of the refractive index of single-mode fiber on the intensity of the light propagating therethrough, and chromatic dispersion which causes different optical frequencies to travel at different group velocities. In addition, for wavelength division multiplexed (WDM) systems in which a plurality of optical channels are transmitted on the same optical fiber, crosstalk between channels caused by the fiber's nonlinear index or incomplete channel selection at the receiving terminal must be considered. Generally speaking, the impairments that limit the system's performance cause two types of degradation in the received eye pattern; random fluctuations in the bit energy (caused by noise) and non-random pulse shape distortions. Distortions of the second type are sometimes referred to as Inter-Symbol Interference or ISI. As the bit rates rise into the gigabit per second range it becomes critical to manage those impairments that effect the shape of the received pulses, and to limit the ISI.

Methods of reducing noise and distortion in single channel lightwave transmission systems include the use of the NRZ format with synchronous polarization, phase, and amplitude modulation (U.S. Ser. No. 60/012,453, filed Feb. 28, 1996) dispersion management of the transmission line, and/or the use of optical solitons. As discussed in U.S. Pat. No. 5,526,162, modulating the state-of-polarization of the optical carrier at the bit-rate of the transmitted NRZ signal (a so-called synchronous modulation technique) can greatly improve the transmission performance of long-haul optical amplified transmission systems. In addition to the synchronous polarization modulation, superimposed amplitude and phase modulation can dramatically increase the eye opening of the received data pattern. As discussed in Bergano, et al., "100Gb/s Error Free Transmission over 9,100 km using Twenty 5 Gb/s WDM Channels," OFC '96, paper PD23, San Jose Calif., February 1996, these synchronous modulations techniques were used in a WDM demonstration having a total transmission capacity of 100 Gb/s (20 WDM channels at 5 Gb/s) over 9,100 km. Another approach to reducing noise and distortion employs soliton pulses, which essentially result from the selection of a particular amplitude modulation and dispersion map.

In patent application, Bergano 20 filed Dec. 20, 1996, a method and apparatus is provided that yields improved performance of optical transmission systems by synchronous modulation of the transmitted signal's amplitude. An amplitude modulator receives an optical signal onto which data has been modulated at a predetermined frequency. The modulator re-modulates the amplitude of the optical signal in a continuous fashion with a waveform that is periodic and whose fundamental frequency is equal to the same predetermined frequency at which the data is modulated onto the optical signal. The resulting signal (which is neither a pure NRZ or RZ signal) is more tolerant to the distortions usually found in lightwave transmission systems, thus giving superior transmission performance. For a single channel transmission line, the waveforms of the various modulations imparted to the optical signal may be optimized for the particular characteristics of the transmission line.

However, when the previously mentioned technique is applied to WDM systems transmitting a plurality of optical channels on the same fiber, optimum performance may not be achieved because each optical channel experiences different transmission line characteristics (due to the dispersion slope or a lack of flatness in the EDFA gain). As a result of these differing characteristics, re-modulating the data-modulated signal with a uniform waveform across all channels is problematic.

SUMMARY OF THE INVENTION

In accordance with the present invention, a method and apparatus is provided that yields improved performance of long-distance WDM transmission by optimizing the transmitted signal format of each optical channel. The modulation format of each channel is optimized for the particulars characteristics of a given channel, such as launch power, gain equalization, and chromatic dispersion. The various formats may include transmitting optical pulses modulated with dispersive (e.g., NRZ, RZ) and nondispersive (e.g., soliton) pulses in the same optical fiber. The modulation format also may be optimized by varying the amount of synchronous amplitude, phase and/or polarization modulation placed on each channel. Thus, for example, in a single fiber NRZ signals may be transmitted for wavelengths lower than the average zero dispersion wavelength while fundamental or higher order solitons may be transmitted for wavelengths higher than the average zero dispersion wavelength. This invention allows the optical bandwidth of a WDM transmission system to be used more efficiently. Additionally, less stringent requirements may be imposed on the chromatic dispersion of the optical fiber constituting the transmission line.

In one particular embodiment of the invention, an apparatus is provided for transmitting an optical signal. The apparatus includes an optical signal source for generating an optical signal having a plurality of optical channels onto which data is modulated at a plurality of predetermined frequencies to provide a plurality of optical data channels. An amplitude modulator is coupled to the optical signal source for modulating each of the optical channels with a waveform that is independently adjustable from one another. A clock, coupled to the amplitude modulator, has a plurality of frequencies that respectively determine the modulation frequencies imparted to the plurality of optical channels by the amplitude modulator. Each of the frequencies of the clock is phase locked and equal to its respective predetermined frequency at which is data is modulated.

DETAILED DESCRIPTION

Figure 1:
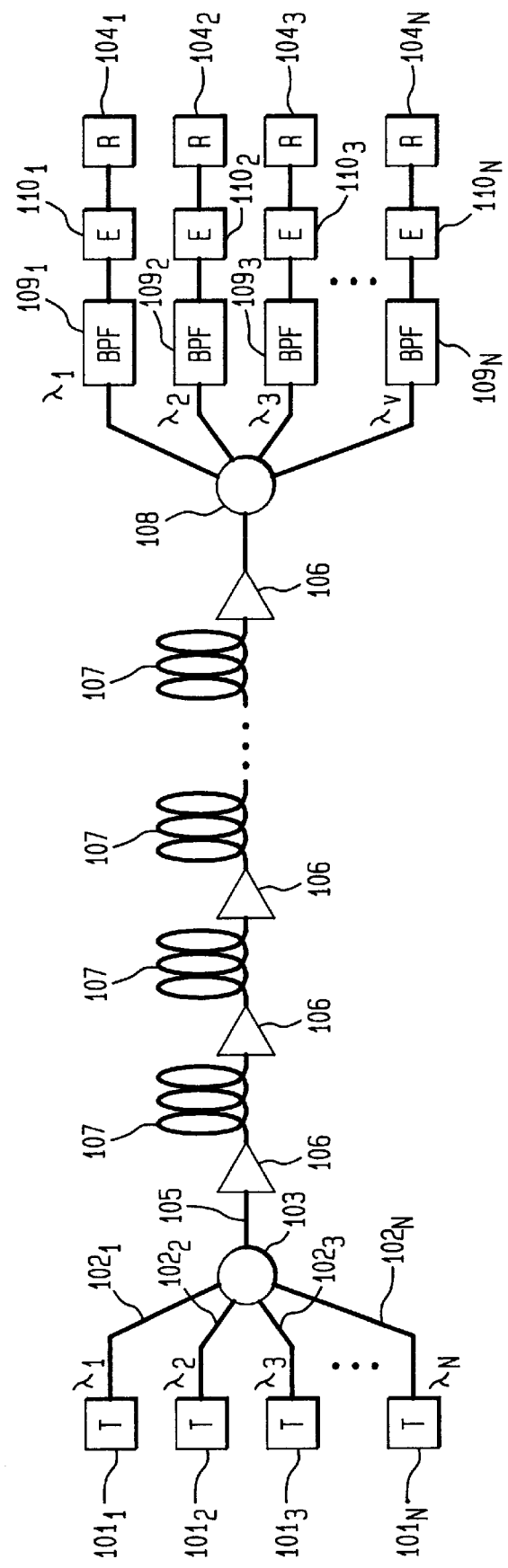
FIG. 1 shows a simplified block diagram of an exemplary wavelength division multiplexed transmission system, in accordance with the present invention.

FIG. 1 shows a simplified block diagram of an exemplary wavelength division multiplexed (WDM) transmission systems in accordance with the present invention. The transmission system serves to transmit a plurality of optical channels over a single path from a transmitting terminal to a remotely located receiving terminal. Specifically, a plurality of transmitters $101_1, 101_2, \ldots, 101_N$ transmit data signals on a set of wavelengths $\lambda_1, \lambda_2, \ldots, \lambda_N$, which are respectively carried on a plurality of paths $102_1, 102_2, \ldots 102_N$. The data channels are combined onto a single path by a signal combiner 103. The functionality of the signal combiner 103 can be performed by a variety of devices such as a wavelength independent directional coupler or a wavelength router of the type described in U.S. Pat. Nos. 5,002,350 and 5,412,744. The combined set of optical channels are transmitted to a plurality of remote receiving terminals 104 via optical transmission path 105, which could, for example, include erbium-doped fiber-amplifiers 106 optically coupling individual spans of single-mode optical fibers 107. A 1×N splitter 108 and a plurality of optical bandpass filters 109 demultiplexes the optical channels at the remote or receiving end of the system. As those skilled in the art will appreciate, the functionality of the splitter 108 and bandpass filters 109 may be achieved in a number of different ways. For example, the previously mentioned wavelength router that is employed as a multiplexer in the transmitter also may be used as a demultiplexer in the receiver. After traversing the bandpass filters 109 the optical channels each enter a dispersion equalizer 110, which compensate for the dispersion that has accumulated in each channel. The equalizer 110 could be a length of single-mode fiber that has an amount of dispersion substantially equal in magnitude, but opposite in sign, to the dispersion that has accumulated in its respective channel at the remote terminal. Alternatively, the dispersion equalizer 110 could be a chirped fiber grating operating in reflection mode.

Figure 2:
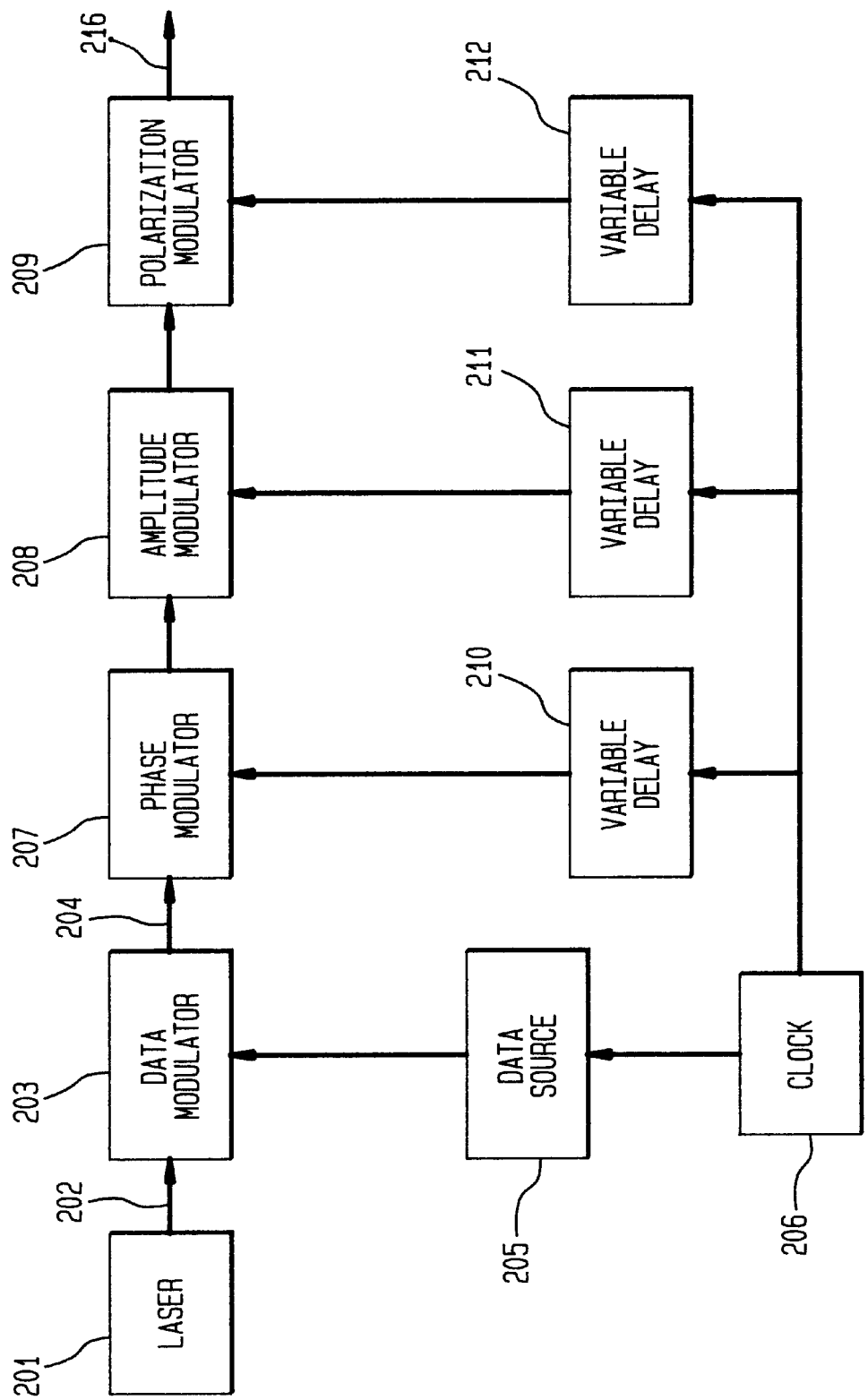
FIG. 2 shows a simplified block diagram of a synchronously modulated transmitter.

FIG. 2 shows a simplified block diagram of a synchronously modulated transmitter that is similar to the transmitter disclosed in patent application Ser. No. 08/771,097 filed Dec. 20, 1996. The transmitter includes a laser 201 for producing a continuous wave (CW) optical signal 202. The optical signal 202 is transmitted to a data modulator 203 that modulates the signal to impart information thereto in a well known fashion, producing a modulated optical information signal 204. The data modulator 203 receives the data to be imparted to the optical signal 202 from a data source 205 and modulates the optical signal 202 at a frequency determined by a clock 206. The optical information signal 204 is transmitted from the data modulator 203 to optical phase modulator 207, amplitude modulator 208, and finally to polarization modulator 209 to produce the output signal 216. The clock 206 drives the three modulation stages via a series of variable delay elements 210, 211, and 212. The variable delay elements are used to selectively adjust the delays of the additional optical phase, amplitude, and polarization modulation imparted respectively by modulators 207, 208, and 209 relative to the delay of the data modulation imparted by data modulator 203. Additional details concerning this transmitter may be found in the previously mentioned U.S. Patent.

Figure 3:
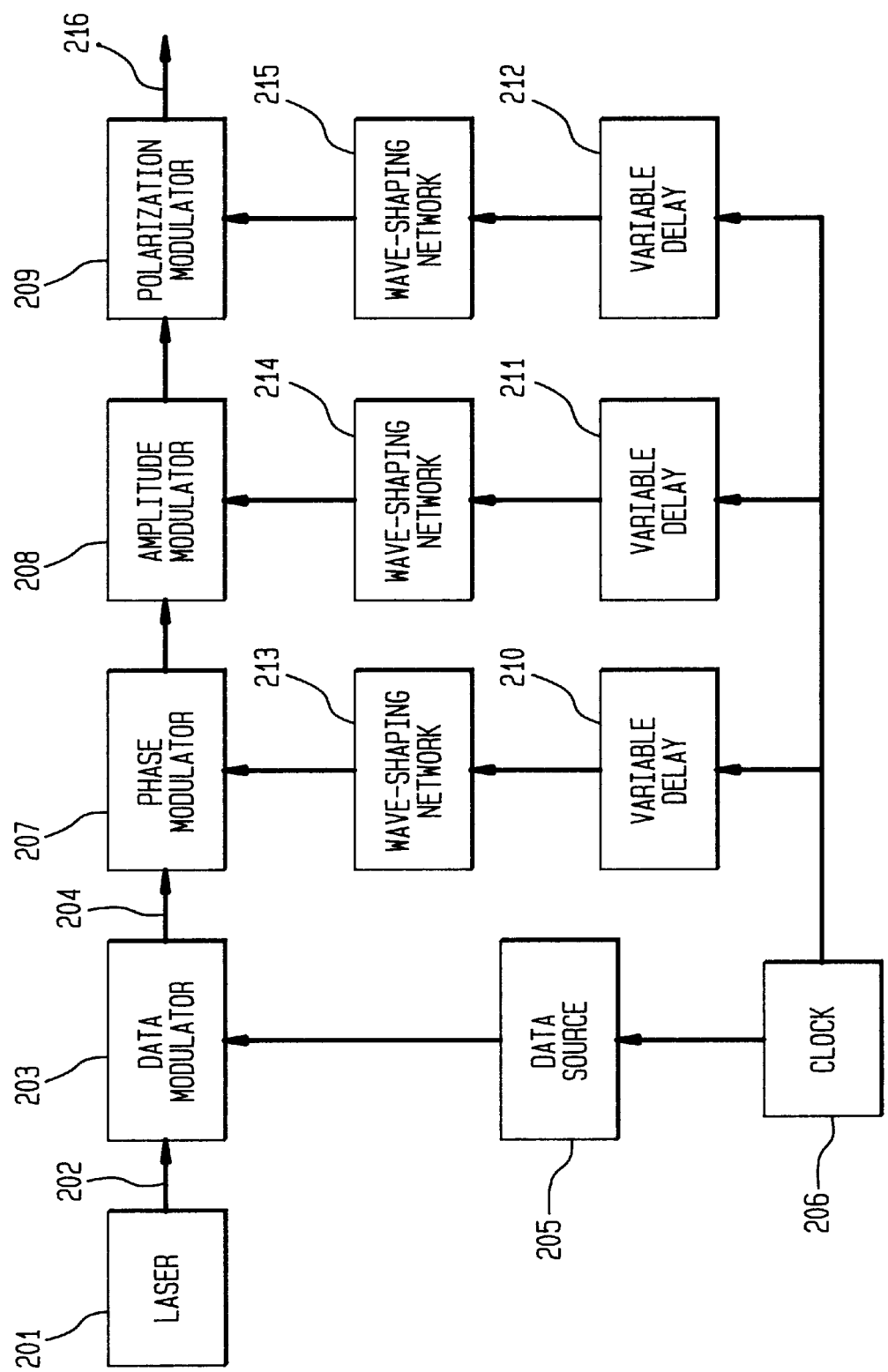
FIG. 3 shows a simplified block diagram of a synchronously modulated transmitter in accordance with the present invention.

FIG. 3 shows a simplified block diagram of a synchronously modulated transmitter in accordance with the present invention. In FIGS. 2 and 3, like elements are denoted by like reference numerals. In FIG. 3, the clock 206 drives the three modulation stages 207, 208, and 209 via variable delay elements 210, 211, and 212, respectively, as well as via waveshaping networks 213, 214, and 215, respectively. It should be noted that while modulators 203, 207, 208 and 209 all impart modulation to a given optical channel at the same frequency, this frequency may differ from channel to channel. The wave-shaping networks 213, 214, and 215 generate the actual modulation waveforms that respectively drive the modulators 207, 208, and 209. Wave-shaping networks allow each channel of the data modulated signal 204 to be re-modulated with a different waveform so that the performance of each channel can be optimized independently of one another. That is, wave-shaping networks 213, 214, and 215 advantageously enhance the flexibility of the transmitter by allowing the optical phase, amplitude and polarization of the modulation waveform to be varied in a manner tailored to each given channel while maintaining its fundamental frequency at the bit rate determined by clock 206. Accordingly, the wave-shaping networks take into account the different transmission line characteristics experienced by each channel.

The manner in which the clock 206 drives the phase modulator 207, the amplitude modulator 208, and polarization modulator 209 can be described by examining the electric field components of the optical information signal 204 (before the additional modulation is imparted) and optical signal 216 (after the additional modulation is imparted). Optical information signal 204 may be described by the following set of equations for the electric field components in x-y coordinates:

$$E_x(t) = A_x(t) e^{i(\omega t + \phi_{x-in}(t))} \quad (1)$$

$$E_y(t) = A_y(t) e^{i(\omega t + \phi_{y-in}(t))} \quad (2)$$

where $\omega$ is the optical carrier frequency, $A_x(t)$ and $A_y(t)$ are assumed to be real field amplitudes which include the intensity modulation imposed by data modulator 203, and $\phi_{x-in}(t)$ and $\phi_{y-in}(t)$ are the optical phase components and include any optical phase modulation imposed in the modulation process. When the information signal 204 propagates through the three modulation stages 207, 208, and 209, the effect of amplitude modulator 208 can be described by additional real multiplying terms in front of $A_{x,y}(t)$, while the phase and polarization modulation will be described by the phase terms $\phi_{x,y}(t)$. In the following example it is assumed that the amplitude modulator 208 is driven with an arbitrary waveform, and that the phase modulator 207 and polarization modulator 209 are driven with sinusoidal signals. Thus, the electric field components of the output waveform 216 are described by;

$$E_{x\text{-}out}(t) = \sqrt{I(t)}\, A_x(t) e^{i(\omega t + \phi_{x\text{-}out}(t))} \quad (3)$$

$$E_{y\text{-}out}(t) = \sqrt{I(t)}\, A_y(t) e^{i(\omega t + \phi_{y\text{-}out}(t))} \quad (4)$$

$$\phi_{x\text{-}out}(t) = a_x \cos(\Omega t + \Psi_2) + b \cos(\Omega t + \Psi_1) \quad (5)$$

$$\phi_{y\text{-}out}(t) = a_y \cos(\Omega t + \Psi_2) + b \cos(\Omega t + \Psi_1) \quad (6)$$

The amplitude modulator 208 serves to modulate the optical signal by varying only the real amplitudes $A_x(t)$ and $A_y(t)$, with a function F(t) that is periodic and has a fundamental frequency component that is equal to, and phase locked to the clock signal generated in 206. Modulator 208 impresses an additional amplitude modulation such that the intensity of signal 204 is multiplied by I(t). Here it is assumed that the periodic function F(t) is normalized to be in the range bounded by [+1,−1]. I(t) is given by;

$$I(t) = 0.5 * [(1-B)F(t + \Psi_{am}) + 1 + B] \quad (7)$$

$$B \equiv \frac{100 - A_{am}}{100 + A_{am}} \quad 0 \leq A_{am} \leq 100 \quad (8)$$

where $A_{am}$ is the percentage of amplitude modulation placed on signal 204 by modulator 208, and $\psi_{am}$ is the phase angle of the modulation with respect to the data modulation. Thus, I(t) is simply a scaled version of periodic function F(t) with a maximum value of unity, a minimum value of B, and is offset in time by $\psi_{am}$. It is anticipated that the functional shape of the additional amplitude modulation will be determined by the wave-shaping network 214, and that the offset $\psi_{am}$ is adjustable by variable delay element 211.

In accordance with the present invention, the optical phase modulator 207 and polarization modulator 209 are driven synchronously by the clock 206 so that the phase of the optical information signal is re-modulated at a rate equal to the rate at which data is imparted to the optical signal 204. Similar to the amplitude modulation procedure discussed above, the functional shape of the optical phase and polarization modulation is determined by wave-shaping networks 213 and 215, respectively, while the relative delay between the data modulation and the additional optical phase and polarization modulation is adjustable by variable delay elements 210 and 212, respectively.

To further illustrate the principles of the invention, the following example will assume that the synchronous modulation that is imparted is sinusoidal. This modulation is described by equations 5 and 6. The phase modulation imparted to the optical signal includes two separate and independent phases: a phase $\psi_1$ associated with the optical phase modulator 207 and a phase $\psi_2$ associated with polarization modulator 209. The terms $a_x$ and $a_y$ are the phase modulation indices of the polarization modulator, b is the phase modulation index of the optical phase modulator, $\psi_{1,2}$ are the phase delay offsets determined by delay elements 210 and 212, and $\Omega$ is the bitrate determined by clock 206.

As equations (5) and (6) indicate, the optical phase modulator 207 imparts the same phase modulation to both the x and y components of the optical signal. Accordingly, the optical phase modulator 207 modulates the optical phase of signal 204 without modulating the polarization of the optical signal. The reason the optical phase modulator 207 does not modulate the polarization is because the polarization modulation of the optical signal is proportional to the difference between the phases $\phi_x$ and $\phi_y$ and this difference is unaffected by the optical phase modulator 406 since it modulates both $\phi_x$ and $\phi_y$ by equal amounts. In principle, every possible State-of-Polarization (SOP) of a monochromatic signal having these electric field components can be obtained by varying the ratio $A_x/A_y$ while maintaining the value of $(A_x^2 + A_y^2)$ constant and varying the relative phase difference $\phi_x - \phi_y$ between 0 and $2\pi$. However, the polarization modulator 209 serves to modulate the SOP of the optical signal by varying only the difference of the phases $\phi_x$ and $\phi_y$, which is sufficient to provide a SOP whose average value over a modulation cycle is low. Polarization modulator 209 operates to change the SOP of the optical information signal in such a way that it reduces the degree of polarization over the modulation period from unity. Accordingly, the output signal 216 has a degree of polarization that can be substantially zero and is said to be polarization scrambled. In one example of the operation of the polarization modulator 209, the SOP of optical information signal 216 traces a complete great circle on the Poincaré sphere. Alternatively, the SOP of the optical signal may reciprocate along the Poincaré sphere. In either case, the average value of the SOP over each modulation cycle is substantially lowered from its normal value of unity.

One of ordinary skill in the art will recognize that the functions of the data modulator 203, and the synchronous phase, amplitude, and polarization modulators 207, 208 and 209 may be realized in a single functional unit. For example, as previously mentioned, data modulator 203 may also perform the functions of the amplitude modulator 208 by having the data source 205 provide the proper electrical drive signal. In addition, the functions of phase modulator 207 and polarization modulator 209 could be combined in a manner similar to that shown in FIG. 3 of U.S. Pat. No. 5,526,162.

Figure 4:
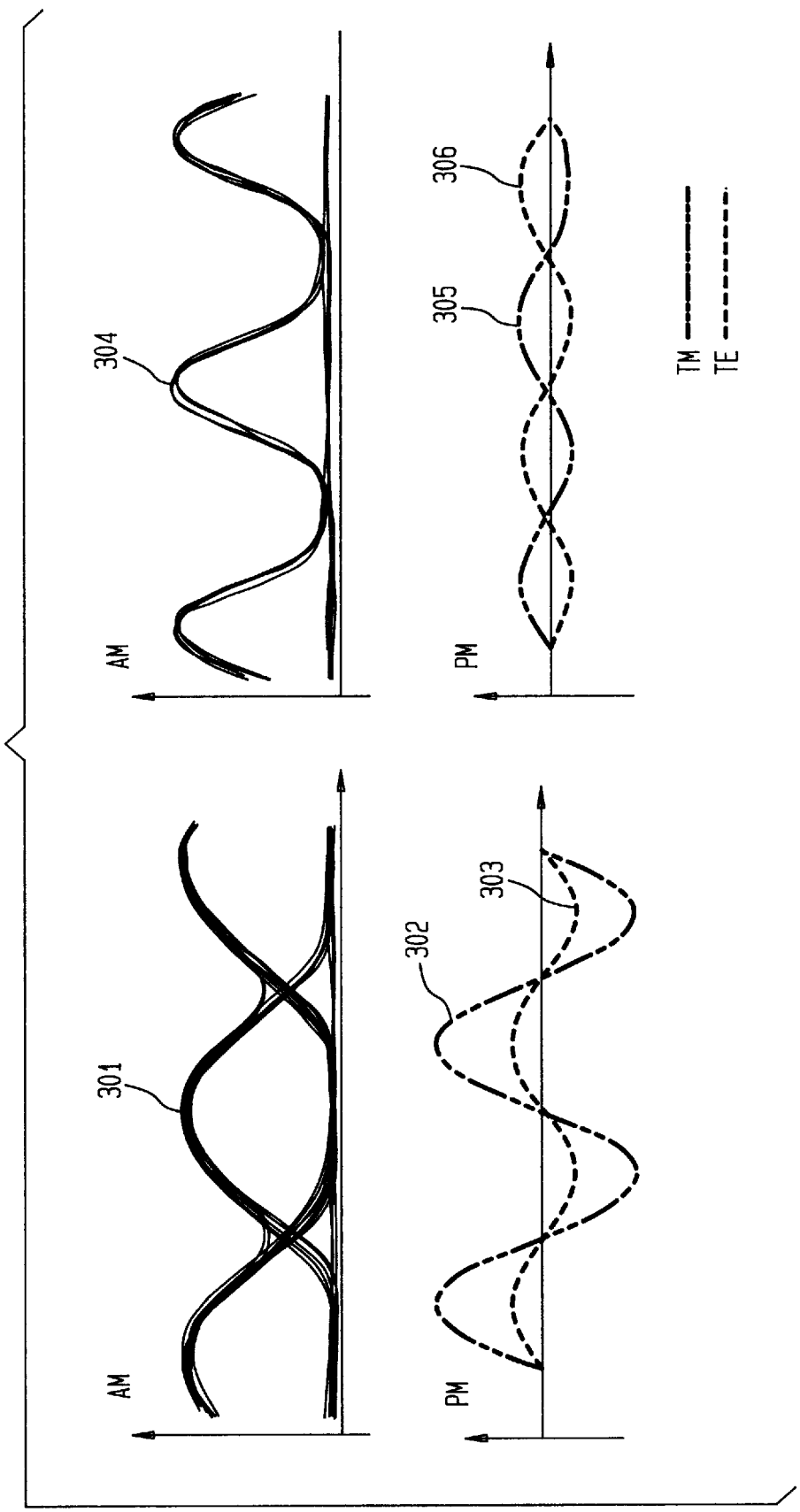
FIG. 4 shows typical eye diagrams produced by the transmitter shown in FIG. 3 with different amounts synchronous amplitude, phase, and polarization modulation.

FIG. 4 shows two examples of typical amplitude and optical phase waveforms that are present at the output port 216 of the transmitter shown in FIG. 2 when the periodic waveform providing the additional amplitude, phase, and polarization modulation is a sinusoidal function. The amplitude modulator 208 producing these waveforms is a balanced Mach-Zender modulator. In the leftmost example, eye diagram 301 shows an NRZ waveform with 60% amplitude modulation as defined by equation 4 (see also, FIG. 5, insert). Waveforms 302 and 303 show the optical phases for the two orthogonal components in this example. In this example an average phase modulation (given by the average of waveforms 302 and 303) is imparted as well as a net polarization modulation (related to the difference between waveforms 302 and 303 ). Likewise, in the rightmost example, eye diagram 304 shows an RZ waveform produced by the nonlinear switching characteristic of amplitude modulator 208 when driven by a sinusoidal signal. Waveforms 305 and 306 show the optical phases for the two orthogonal components when only polarization modulation is employed.

Figure 5:
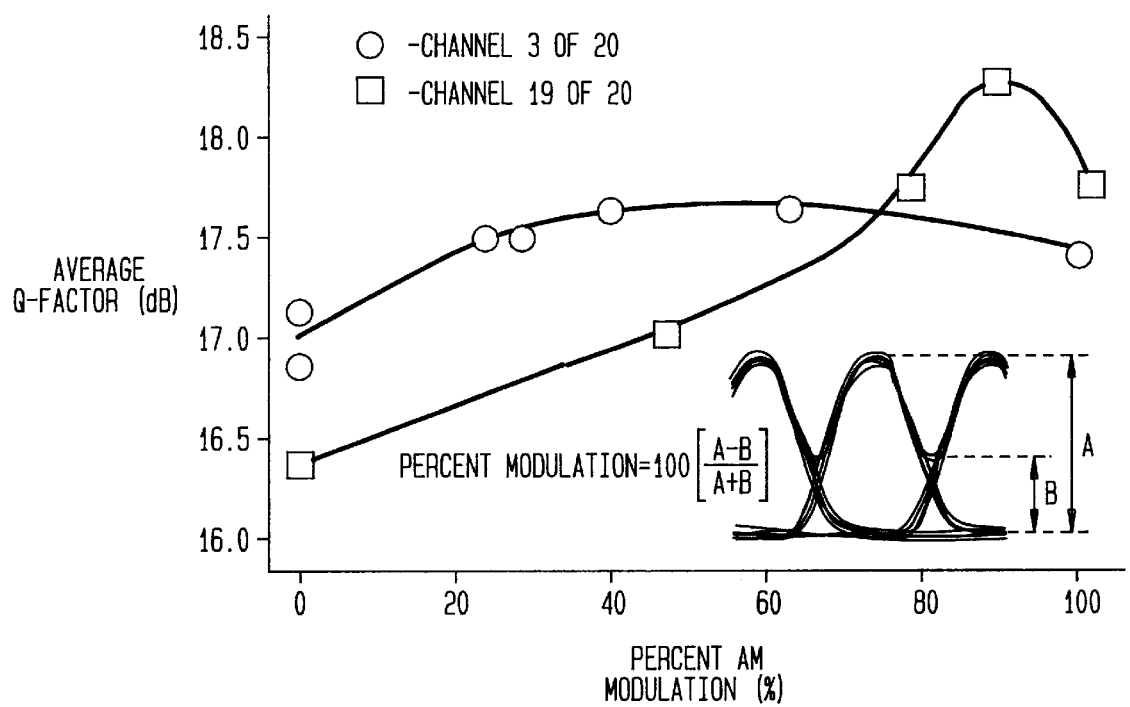
FIG. 5 shows the resulting Q-factor verses the level of synchronous amplitude modulation for an arrangement employing a transmitter similar to that shown in FIG. 2.

FIG. 5 shows experimental results that were obtained by an arrangement similar to that shown in FIG. 3 and which incorporated an NRZ transmitter imparting synchronous amplitude, phase, and polarization modulation. This figure graphically demonstrates a basic underlying principle of the invention, namely, that different channels in the same optical fiber of a WDM transmission system have different optimal modulation characteristics. In this demonstration, the transmission path, which used circulating loop techniques, extended 9,300 kms and employed twenty WDM channels, each operating at a bit rate of 5.0 Gbits/sec with an average launch power of 7 dBm for all of the channels. This arrangement was similar to the one discussed in Bergano et al., "Wavelength Division Multiplexing in Long-Haul Transmission Systems," IEEE Journal of Lightwave Technology, Vol. 14, No. 6, p. 1299 June 1996, except in that system the EDFAs were pumped at 980 nm, which resulted in a better noise figure and longer transmission distance. FIG. 5 shows the resulting Q-factor (i.e., the electrical signal-to-noise ratio) versus the depth of modulation for channels 3 and 19. The two channels are representative of two different chromatic dispersion regions in the system. Channel 3, located 6.8 nm below the zero dispersion wavelength $\lambda_0$, had an average dispersion of −0.51 ps/km-nm and channel 19, located 2.8 nm above the zero dispersion wavelength ) $\lambda_0$, had an average dispersion of +0.21 ps/km-nm. The data indicates that good Q-factor performance can be achieved by selecting an appropriate value for the depth of modulation, which is different from previously employed modulation techniques such as pure NRZ (0%) AM or RZ ($\geq$100%). The insert to FIG. 5 defines the depth of modulation as it is employed herein. This definition is used along the x-axis of FIG. 5.

Figure 6:
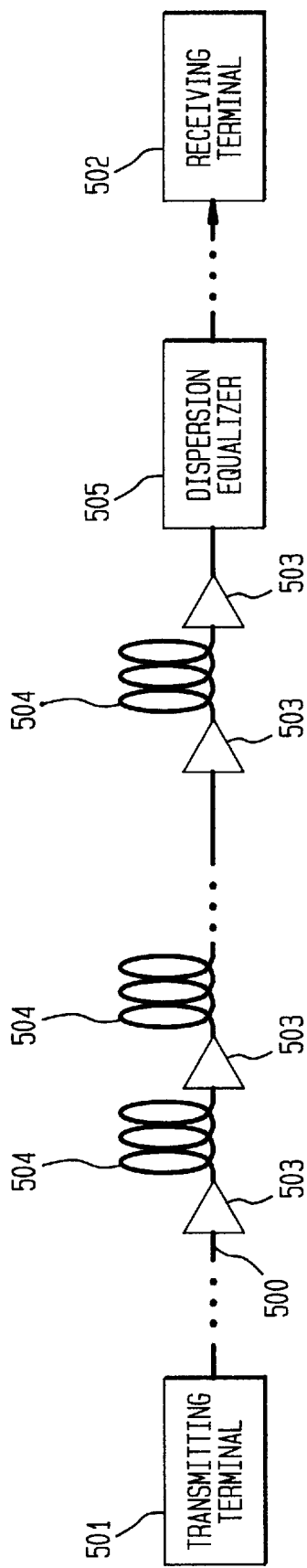
FIG. 6 shows a simplified block diagram of an optical fiber transmission system in accordance with the present invention.

FIG. 6 shows a simplified block diagram of an exemplary optical fiber transmission system facilitating the practice of the invention. As shown, the figure includes an optical transmission path 500, a transmitting terminal 501, and a receiving terminal 502. The transmitting terminal 501 provides an optical data signal that is to be transmitted to the remote receiving terminal 502 via an optical fiber transmission path 500. The optical signal presented by the terminal 501 to the optical path 500 may consist of multiple WDM optical carriers each carrying an SDH signal. FIG. 6 shows a single period of the dispersion map composed of optical amplifiers 503, spans of transmission fiber 504, and dispersion equalizer 505. In a typical long-haul system, this combination might be repeated several or more times to span the length of the entire system. In one embodiment of the invention, the transmission fibers 504 could be dispersion-shifted single-mode fibers with an average zero dispersion wavelength higher than the operating wavelengths of the system. For example, the transmission fibers could be similar to those used in the arrangement shown in Bergano et al., European Conference on Optical Communications, Brussels, Belgium, paper Th.A.3.1, September 1995, where the transmission fiber had an average zero dispersion wavelength of 1580 nm, and a dispersion slope of about 0.073 ps/km-nm². The dispersion equalizer 505 may be realized by a section of single-mode fiber having a compensating dispersion opposite in sign from that of the dispersion of the optical amplifiers 503 and which is sufficient in magnitude to return the average zero dispersion wavelength to a value within the band of the WDM channels.

A simple linearized chromatic dispersion relationship between the signal wavelength $\lambda_{sig}$ and the dispersion D is given by:

$$D = SL(\lambda_{sig} - \lambda_0) \quad (9)$$

where the dispersion D is given in units of ps/nm, S is the dispersion slope in units of ps/km-nm², and $\lambda_0$ is the average zero dispersion wavelength of the transmission line. Equation 9 clearly indicates that the minimum dispersion point occurs at only one wavelength $\lambda_0$. Accordingly, if transmission line 500 were transmitting a set of WDM channels, only one channel could be located at the zero dispersion wavelength; all of the other channels would accumulate dispersion. This problem can be alleviated to first order by using individual channel dispersion equalization 110 at the receiver (see FIG. 1). However, since these systems are subject to nonlinear penalty, the ability to correct for the non-zero dispersion at the receiver terminal is limited.

Figure 7:
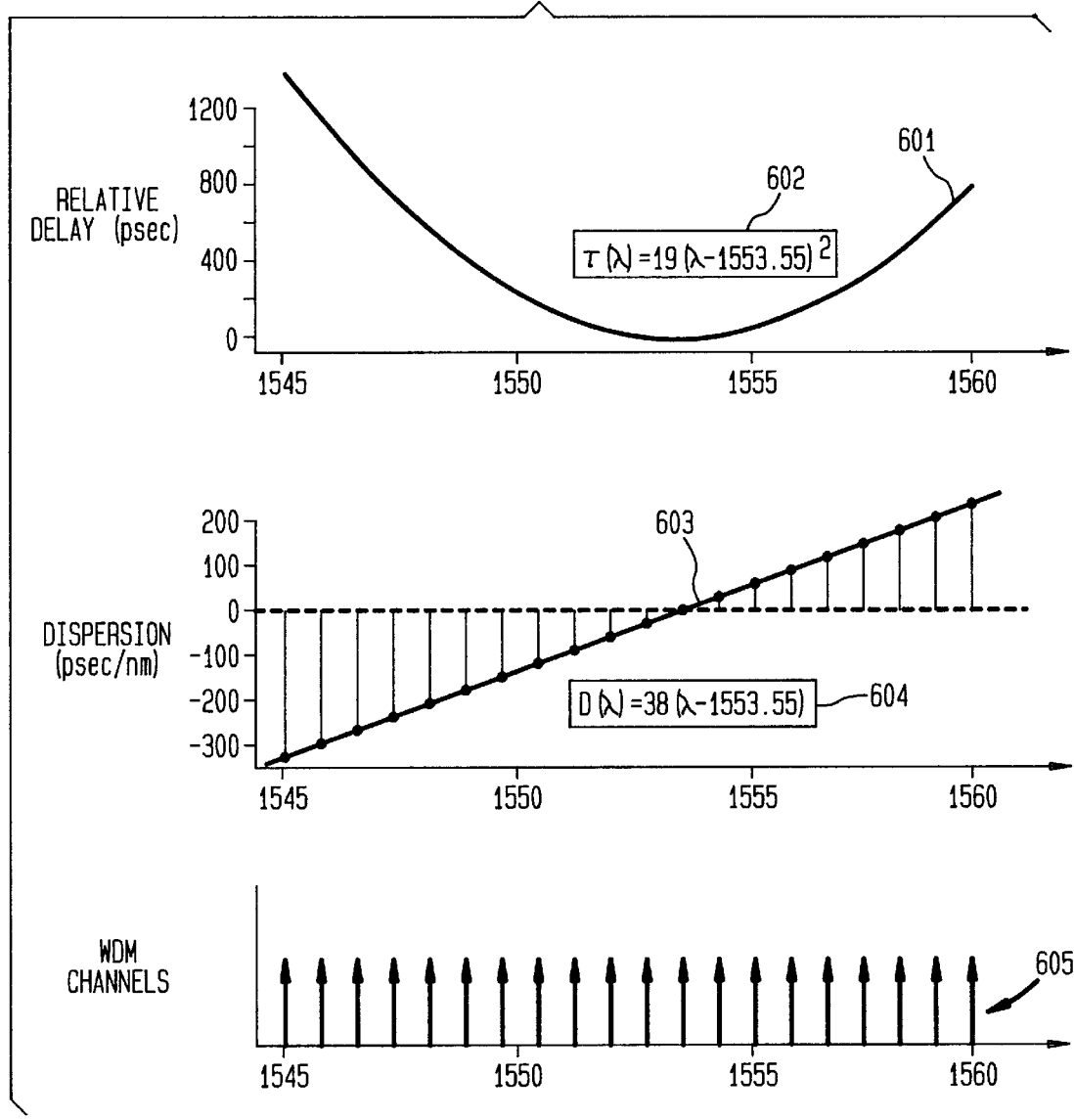
FIG. 7 shows the relative delay difference and corresponding chromatic dispersion for one equalization period of an exemplary WDM transmission system.

FIG. 7 shows the relative delay difference 601 and the chromatic dispersion 603 verses wavelength for a single period of the dispersion map shown in FIG. 5. The delay characteristic is given by equation 602, and the dispersion characteristic is given by equations 604. The bottom of FIG. 6 shows the wavelengths at which the WDM channels 605 are located. FIG. 6 assumes that the dispersion shifted fiber has a zero dispersion wavelength of 1580 nm and a dispersion slope of 0.073 ps/km-nm², followed by 56.8 km of conventional single-mode fiber, with a zero dispersion wavelength of about 1310nm and a dispersion value of about 17 ps/nm-km in the 1553nm region. As indicated by the vertical lines on the dispersion curve 603, different WDM channels experience different amounts of chromatic dispersion. The manner in which the dispersion accumulates with transmission distance is shown in FIG. 8.

Figure 8:
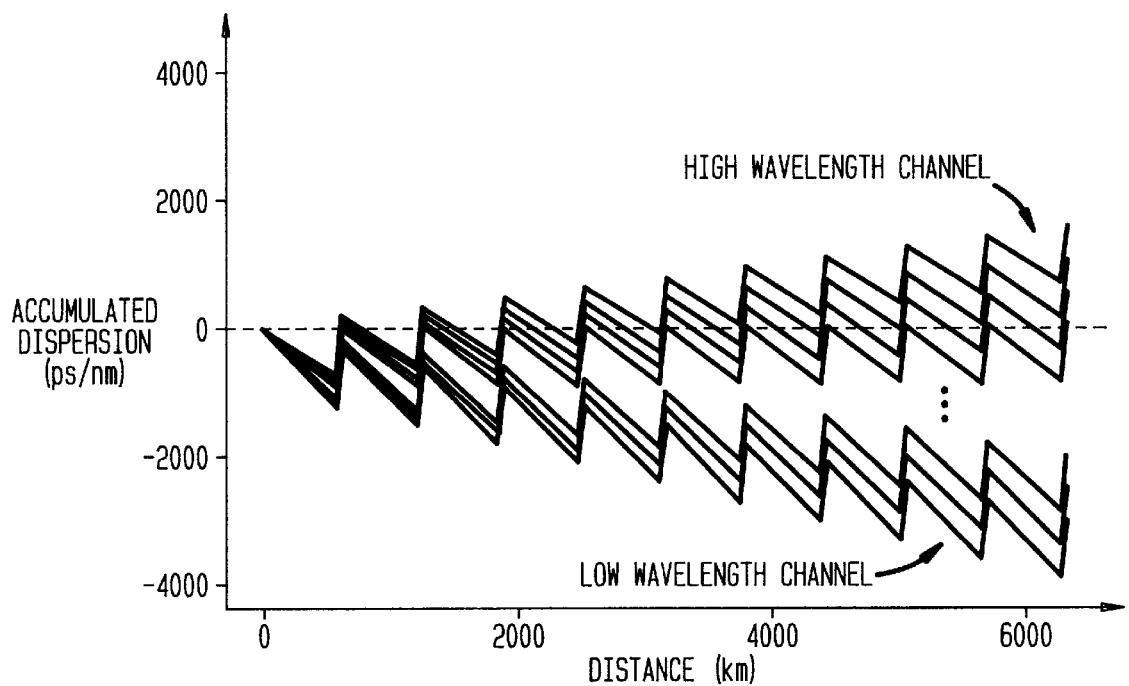
FIG. 8 shows the accumulated dispersion verses transmission distance for several channels of an exemplary WDM transmission system.

FIG. 8 shows the accumulated dispersion verses transmission distance for several channels in the system of FIG. 6 which span the average zero dispersion wavelength. Because the dispersion in the transmission fiber is a function of the wavelength of the actual WDM channel, each channel experiences a different amount of dispersion. For example, the channels located above the zero dispersion wavelength will accumulate a net positive dispersion, which is sometimes termed anomalous dispersion, or the soliton region. Channels located below the zero dispersion wavelength accumulate a net negative dispersion, which is sometimes referred to as the normal dispersion region.

Figure 9:
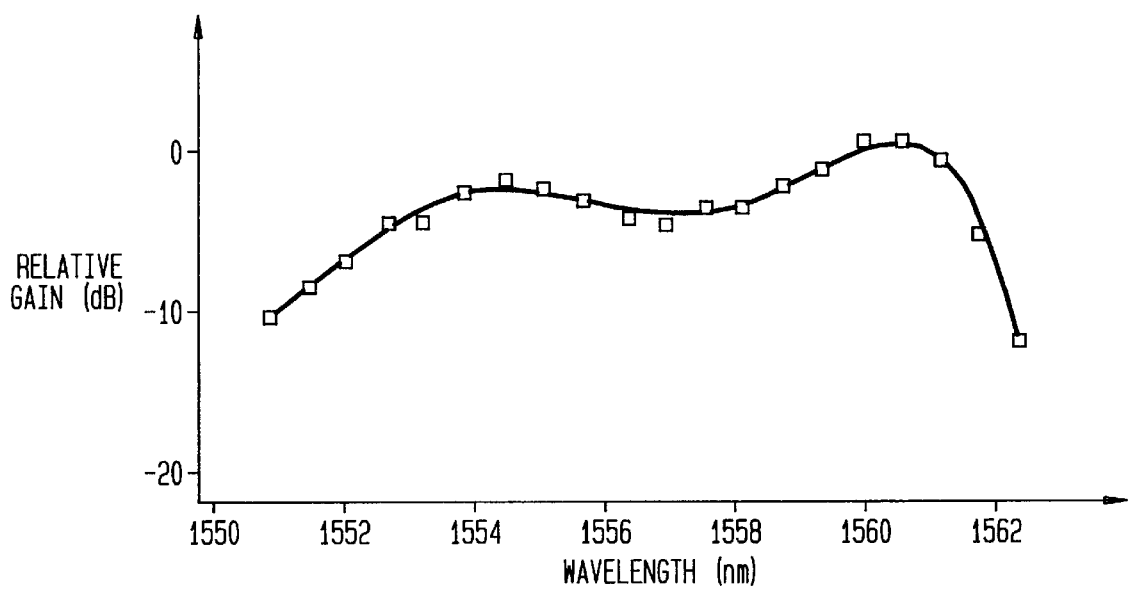
FIG. 9 shows the relative gain difference among 20 channels in an exemplary WDM transmission system after 6300 km propagation
Figure 10:
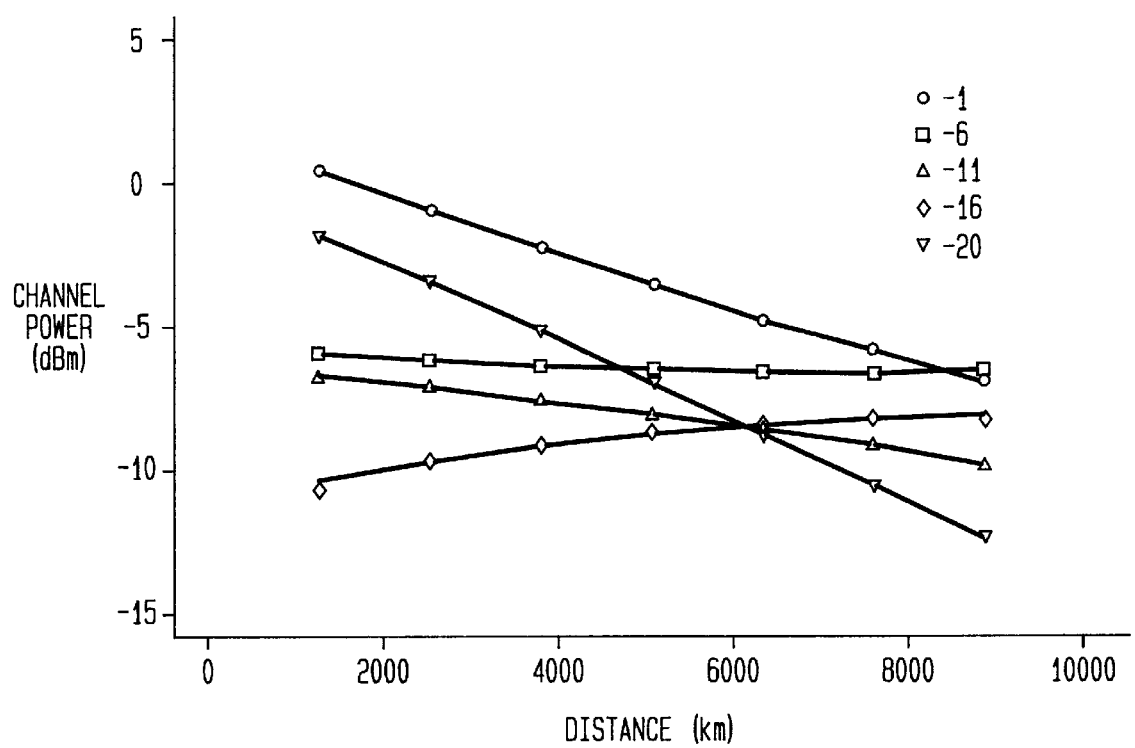
FIG. 10 shows the optical power for 5 out of 20 optical channels launched into the transmission spans of fiber as a function of transmission distance.

FIG. 9 shows a measurement of the relative gain vs. channel wavelength over a transmission distance of 6300 km for a system similar to that discussed in Bergano et al., "Wavelength Division Multiplexing in Long-Haul Transmission Systems," IEEE Journal of Lightwave Technology, Vol. 14, No. 6, p. 1299 June 1996. The data was obtained by comparing the power of each WDM channel launched into the system to the power received at the remote end of the system. As shown, the relative gain can vary by more than 10 dB over the system's length. Because of this gain difference, the power in each channel is not a constant over distance, but rather changes over each amplifier span. For example, FIG. 10 shows the optical power launched into the transmission fiber for 5 out of the 20 WDM channels over a distance of 9000 km. The figure clearly indicates that the launch powers vary as a function of transmission distance because of the unequal gain. Since the different channels have dissimilar power levels, they also exhibit different levels of nonlinear behavior in the fiber.

We claim:

1. An apparatus for transmitting a WDM optical data signal having a plurality of data channels, comprising:
   a plurality of transmitter units each generating one of said data channels, each of said transmitter units including:
   an optical signal source for generating an optical channel onto which data is modulated at a predetermined frequency to provide a data modulated optical channel;
   an amplitude modulator coupled to the optical signal source for modulating said data modulated optical channel;

a clock coupled to the amplitude modulator having a frequency that determines the modulation frequency imparted to the data modulated optical channel by the amplitude modulator, said frequency of the clock being phase locked and equal to said predetermined frequency at which data is modulated; and wherein said amplitude modulators respectively modulate said data modulated optical channels with a waveform independently adjustable from one another.

2. The apparatus of claim 1 wherein each of the amplitude modulators comprises a wave-shaping element for adjusting the waveform modulation imparted to its respective data modulated optical channel to enhance at least one performance criterion.

3. The apparatus of claim 2 wherein each of the optical signal sources includes a continuous-wave optical signal generator and a data source, said clock being coupled to the data source for establishing the respective predetermined frequency at which data is modulated onto the optical channel.

4. The apparatus of claim 2 wherein each of the amplitude modulators modulates the amplitude of its respective data modulated optical channel with a prescribed phase, and further comprising a plurality of electrical variable-delay lines respectively coupling the clocks to the amplitude modulators for selectively varying the prescribed phases.

5. The apparatus of claim 4 wherein each of the electrical variable-delay lines is a phase shifter.

6. The apparatus of claim 2 further comprising:

a plurality of polarization modulators each respectively coupled to each of the amplitude modulators and each of the clocks for modulating the state of polarization of the respective data modulated optical channel such that an average value of the state of polarization over a modulation cycle is substantially reduced from unity;

a plurality of wave-shaping elements each for respectively adjusting a polarization modulator waveform imparted by each of the polarization modulators to enhance at least a second performance criteria.

7. The apparatus of claim 6 wherein each of the polarization modulators modulates the state of polarization by tracing the polarization of its respective data modulated optical channel along at least a portion of the Poincare sphere.

8. The apparatus of claim 6 wherein each of the polarization modulators modulate the state of polarization of its respective data modulated optical channel at its respective predetermined frequency with a prescribed phase, and further comprising a plurality of electrical-variable delay lines respectively coupling each of the clocks to each of the polarization modulators for selectively varying the prescribed phase.

9. The apparatus of claim 8 wherein each of the electrical variable-delay lines is a phase shifter.

10. The apparatus of claim 6 further comprising:

a plurality of optical phase modulators each respectively coupling one of the optical signal sources to one of the amplitude modulators, said optical phase modulators providing optical phase modulation to the data modulated optical channels while imparting substantially no polarization modulation thereto;

a plurality of wave-shaping elements each for respectively adjusting an optical phase modulation waveform imparted to the data modulated optical channels to enhance at least a third performance criterion.

11. The apparatus of claim 10 wherein each of the clocks is respectively coupled to each of the optical phase modulators so that the optical phase modulators provide optical phase modulation to the data modulated optical channels at a frequency that is phase locked and equal to the respective predetermined frequencies.

12. The apparatus of claim 11 further comprising a plurality of second electrical variable-delay lines respectively coupling each of the clocks to each of the optical phase modulators for selectively varying the phase of the optical phase modulation provided by the respective optical phase modulator.

13. The apparatus of claim 12 wherein each of the second electrical variable-delay lines is a phase shifter.

14. The apparatus of claim 10 wherein said at least one performance criterion and said third performance criterion comprise a common performance criterion selected from the group consisting of a Q-factor, a bit error rate, and a power level.

15. The apparatus of claim 10 wherein said third performance criterion is selected from the group consisting of a Q-factor, a bit error rate, and a power level.

16. The apparatus of claim 6 wherein said second performance criterion is selected from the group consisting of a Q-factor, a bit error rate, and a power level.

17. The apparatus of claim 6 wherein said at least one performance criterion and said second performance criterion comprise a common performance criterion.

18. The apparatus of claim 17 wherein said common performance criterion is selected from the group consisting of a Q-factor, a bit error rate, and a power level.

19. The apparatus of claim 2 wherein said performance criterion is selected from the group consisting of a Q-factor, a bit error rate, and a power level.

20. The apparatus of claim 1 wherein each of the amplitude modulators includes means for selectively adjusting the waveform modulation that is imparted to its respective data modulated optical channel.

21. The apparatus of claim 1 wherein optical pulses generated by the transmitter units into a transmission line comprise dispersive and nondispersive pulses.

22. A method for transmitting an optical signal comprising the steps of:

generating an optical signal having a plurality of optical channels onto which data is modulated at a predetermined frequency; and modulating the amplitude of each of said optical channels with a waveform that is independently adjustable from one another such that modulation is imparted at a frequency phase locked and equal to said predetermined frequency.

23. The method of claim 22 further comprising the step of selectively varying the phase of the amplitude modulation imparted to said data modulated signal.

24. The method of claim 22 further comprising the step of selectively phase modulating each of said optical channels while imparting substantially no polarization modulation to the optical signal, wherein said phase modulation imparted to each of said optical channels is independently adjustable from one another.

25. The method of claim 24 wherein the step of selectively phase modulating said data modulated signal comprises the step of selectively phase modulating said data modulated signal at a frequency equal to said predetermined frequency at which data is modulated.

* * * * *